(12) United States Patent
Chebil et al.

(10) Patent No.: US 6,760,481 B1
(45) Date of Patent: Jul. 6, 2004

(54) METHOD AND SYSTEM FOR PROCESSING IMAGE DATA

(75) Inventors: Fehmi Chebil, Tampere (FI); Kai Willner, Tampere (FI); Jani Lainema, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 526 days.

(21) Appl. No.: 09/591,482

(22) Filed: Jun. 9, 2000

(30) Foreign Application Priority Data

Jun. 10, 1999 (FI) .................................................. 991328

(51) Int. Cl.$^7$ ............................................... G06K 9/36
(52) U.S. Cl. ..................................................... 382/240
(58) Field of Search .................................. 382/232, 233, 382/236, 238, 240, 242, 248, 250; 358/432, 433, 261.2, 261.3; 348/384.1, 394.1, 387.1, 395.1, 400.1–404.1, 407.1–416.1, 420.1, 421.1, 425.2, 430.1, 431.1; 341/51, 63, 65, 67, 79, 107; 375/240.02–240.03, 240.11–240.16, 240.18–240.2, 240.22–240.25; 708/203, 300, 307–308, 313, 316–317, 400–405

(56) References Cited

U.S. PATENT DOCUMENTS

| 5,321,776 | A | | 6/1994 | Shapiro ........................ 382/56 |
| 6,084,908 | A | * | 7/2000 | Chiang et al. ............... 375/240 |
| 6,236,757 | B1 | * | 5/2001 | Zeng et al. .................. 382/240 |
| 6,263,110 | B1 | * | 7/2001 | Andrew et al. ............. 382/232 |
| 6,356,665 | B1 | * | 3/2002 | Lei et al. ..................... 382/240 |
| 6,359,928 | B1 | * | 3/2002 | Wang et al. ........... 375/240.05 |
| 6,389,074 | B1 | * | 5/2002 | Andrew ................. 375/240.05 |

OTHER PUBLICATIONS

ISO/IEC JTC1/SC29/WG1 N610.
ISO/IEC JTC1/SC29/WG1 N632.
ISO/IEC JTC1/SC29/WG1 N665.
ISO/IEC JTC1/SC29/WG1 N638.
"A Region Of Interest (ROI) Based Wavelet Compression Scheme For Medical Images", Shin et al., SPIE vol. 3031.
"Wavelets And Signal Processing" Rioul et al., IEEE Signal Processing Magazine, 1991.

* cited by examiner

*Primary Examiner*—Jose L. Couso
(74) *Attorney, Agent, or Firm*—Perman & Green, LLP

(57) ABSTRACT

The invention relates generally to the processing of image data. Especially the invention applies to the coding and decoding of still images for compression and transfer in a mobile telecommunications system. The objects of the invention are fulfilled by providing an image processing procedure, which is based on wavelet transform (202), successive approximation quantization (204, 208) and quadtree coding (206). The quadtree coding preferably comprises the step of coding the significance with two symbols. The solution does not require large data processing or memory capacity. Still it offers a high image quality for a given bit rate compared to the prior art solutions. The solution according to the invention also satisfies the requirements of progressivity in quality and resolution.

35 Claims, 3 Drawing Sheets

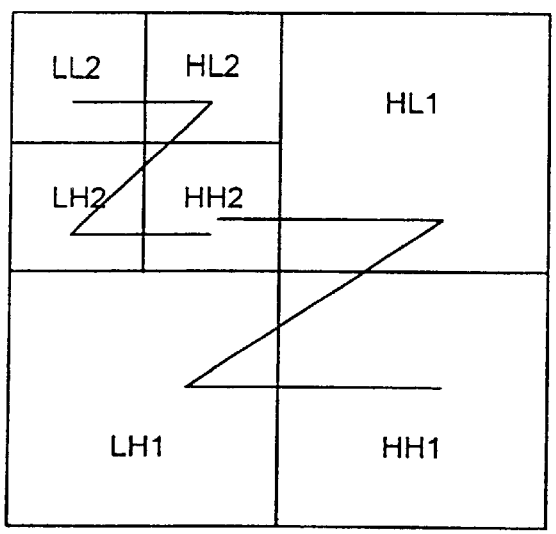
FIG. 3
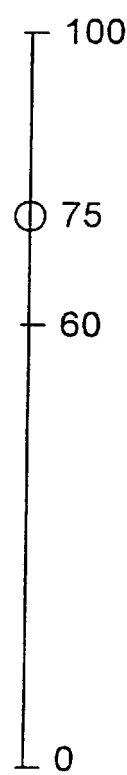
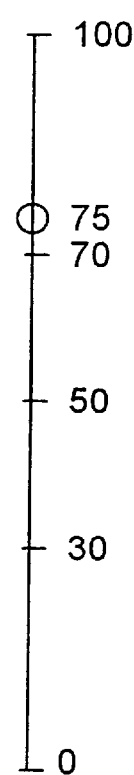
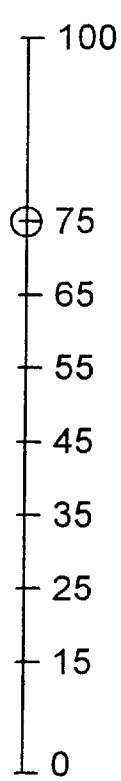
FIG. 4a   FIG. 4b   FIG. 4c   FIG. 4d

METHOD AND SYSTEM FOR PROCESSING IMAGE DATA

The invention relates generally to the processing of image data. Especially the invention applies to coding and decoding of still image data for compression. One application of the invention is for storage and transmission of image data in a mobile telecommunications system.

Digital images tend to include a large amount of data that should be compressed efficiently to allow their usage in different imaging applications. These applications include storage, which varies from a few images in a digital camera to thousands of images in a library for image archival. Applications also include image transmission, which covers mobile and wireless communications as well as the Internet. Therefore, several compression techniques have been developed to fulfil these applications. The efficiency of a compression technique depends mainly on the application it addresses. For mobile communications systems, a compression technique should consider the low memory capacity of the mobile phone and the limited capacity of the transmission channel.

Figure 1:
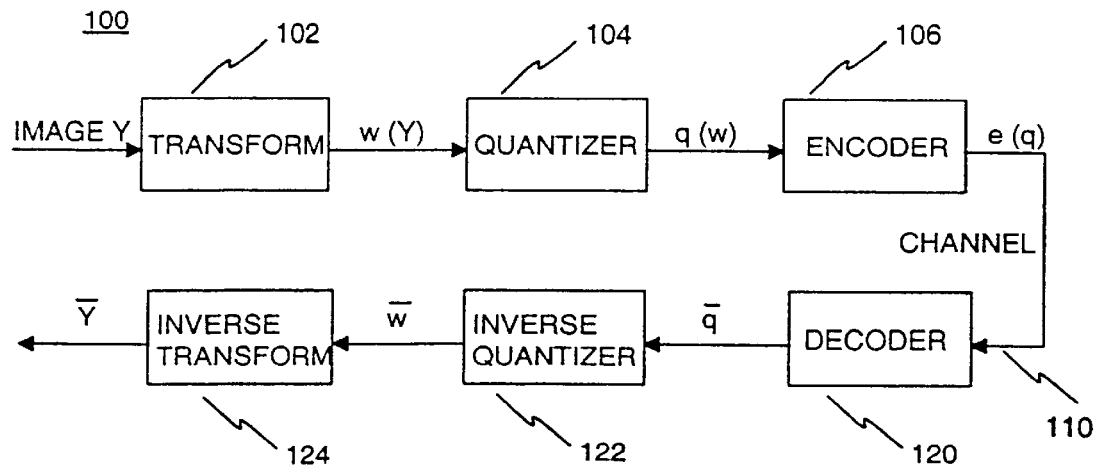

FIG. 1 illustrates a block diagram of a typical image compression and transfer system 100. The digitized input image data Y is first mapped to w(Y) by a transfer function, 102. This may take the form of a transmormation from the spatial domain, where the image is represented by pixel values (e.g. luminance and chrominance) to the spatial frequency domain. Typically after undergoing such a transformation the image data is now expressed as coefficients in the transform domain, e.g. the coefficients of a Discrete Cosine Transform, DCT. Next the coefficients in the transform domain are quantized into determined levels q(w), 104. The quantized data is further encoded, 106. At this stage the image data is in a compressed form. This compressed data may be used for storage, and hence the channel 110 could be the connection to the storage disk of the device to hold the image. The compressed data could be used for transmission, and then the channel 110 could be the channel used for mobile or wireless communications or for Internet transmission. In the expansion (receiving) part of the system the signal e(q) is received from the channel and is decoded in the decoder 120, then inverse quantized 122 and inverse transformed 124 to achieve the resulting image data $\overline{Y}$.

The steps described above form the basic components of codecs used in image compression and decompression. The term codec is the name given to a system or arrangement for image coding which has the ability to both encode and decode image data. Codecs can be rated according to the functionalities they offer and the performance they provide. For example, in a mobile telecommunications environment, a codec is better if it provides:

- the highest possible image quality for a given available data transfer rate;
- progressivity in quality. This means that during encoding and decoding the quality of the image may be gradually enhanced by increasing the number of bits per pixel used in its representation;
- progressivity in resolution. This means that the spatial resolution of the image may be progressively enhanced during encoding and decoding;
- low complexity of implementation;
- resilience to errors that may occur during transmission.

There are commonly used prior art methods for image compression. The most widely used is the standard released by the International Standards Organization (ISO), the JPEG (Joint Photographic Experts Group). The JPEG image compression standard contains 4 parts. The best known and most commonly used one is the first part, known as the JPEG baseline. In addition to its poor performance when applied at low bit rates this compression system does not offer the above functionalities. To overcome JPEG baseline's shortcomings several solutions have been proposed. A brief description of these methods is given below.

It is prior known to use a so-called Embedded Discrete Cosine Transform solution. In this method the image is transformed by a Discrete Cosine Transform applied to 8 by 8 pixels blocks. The quantization is performed in a successive manner that is embedded in the coding part. Coding is performed using a context based arithmetic coding which makes its complexity in memory and in computations higher. Furthermore, this method is block based and hence at low bit rates it leads to blocking artifacts which require the use of post processing filters. Therefore it is not a preferred solution for mobile communications. Further details about this method can be found in [1].

It is also prior known to use a so-called Wavelet Trellis Coded Quantization. This algorithm consists of four phases: A wavelet transform of the image data, a classification and bit allocation of the bands of the transformed data, the classification being obtained by computing statistics of the data. Based on the classifications, quantization of the transform coefficients is performed in trellis fashion. Trellis quantization is adopted from a technique known as trellis modulation which enables use of twice the number of quantization levels allowed at a certain bit rate with constraints on the transitions between the levels. Later the quantized coefficients are coded in bit planes by a context based arithmetic coder. This solution is very complicated for mobile applications and does not offer high performance at low bit rates. Details about this method can be found in [2].

A further prior art solution is called Multi-Threshold Wavelet Coding. In this method wavelet transformation is applied to the image data. The quantization is performed successively and independently for each band of the transformed data, hence the name multi-threshold. The encoding is then performed using a context based arithmetic coding which makes complexity higher and therefore its use for mobile communications not preferred. Details about this method can be found in [3].

A further prior art solution is called Quad-tree based Entropy Coding. In this method the image data is wavelet transformed, then the coefficients in the transform domain are divided in blocks of $2^n \times 2^n$ pixels. Each block is then coded by dividing it into four quadrants. Each quadrant is coded again by dividing it into 4 quadrants, and so on till no further division is possible, to form a tree of quadrants, hence the name quadtree. At the first level the number of bits needed to get the maximum coefficient of the block is sent, then for each quadrant the difference between the maximum coefficient of the block and the maximum coefficient of the quadrant is determined. The advantage of this method is that it requires fewer computations and the complexity of the entropy coding is low. However, the problem with this solution is that the algorithm does not provide progressivity in quality or in resolution which, as stated earlier, are important features for mobile applications. Details about this method can be found in [4].

A further prior art solution is the Compact Quadtree Based Subband Image coding scheme. This prior art method for compression of images is described in documehnt [5]. The method uses wavelet transforms, then the quantization is embedded in the encoding. For each quantization level, a quadtree-based method is used to encode the bands. The significance map (the region where coefficients are higher than the quantization level) in the bands is coded by a quad-tree method which uses three symbols for the representation of its nodes:

"X" corresponds to a quadtree block having at least one coefficient coded in the past quantization threshold, "1" corresponds to a quadtree block where at least one significant coefficient is mixed with an insignificant coefficient in that block and "0" corresponds to a quadtree block where the whole block is insignificant.

One of the symbols is implicitly obtained from the data, because the existence of a significant coefficient in a region implies considering the whole region significant for the coming bit planes. Therefore, this method implicitly assumes that the data in the band are highly correlated. However, this is not the case because the decomposition (i.e. the transform) decorrelates the data. Furthermore, this scheme works poorly in the presence of errors because a wrong decision relating to a particular sample will make the whole region distorted. In this case the error will also propagate from one bit plane to another since the information about a current bit plane is obtained from the previous one.

It is thus an object of this invention to provide a method and a system for compressing images so that high image quality is preserved with low computational complexity and memory requirements. It is also an object of this invention to solve problems of the cited prior art solutions and to fulfil the requirements for image processing that were discussed above.

The objects of the invention are fulfilled by providing an image processing procedure, which is based on a wavelet transform, successive approximation quantization and quadtree coding. The quadtree coding preferably comprises the step of coding the significance of coefficients within quadtree blocks with two symbols.

The present invention offers important advantages over prior art methods. The solution does not require large data processing or memory capacity. Nevertheless, it offers a high image quality for a given bit rate compared to the prior art solutions. The solution according to the invention also provides progressivity in quality and resolution.

As the invented method does not perform any classifications or rate allocations, it embeds the quantization process in the coding part and allows subband skipping. The coding is performed in a simple quadtree form, and arithmetic coding is not required. These advantages make the new solution ideal for mobile communications.

It is characteristic to a method according to the present invention that it comprises the steps of a) transforming the input image data into subbands, b) coding the transformed image data using successive approximation quantisation to produce a bit stream, the successive approximation being embedded in the coding process and c) coding the bit stream with significance information using a quadtree based method and including sign and refinement information in the bit stream.

The invention also applies to a method for processing a bit stream into image data, wherein the bit stream comprises significance, sign and refinement information, being characterised in that the method comprises the steps of decoding the significance information from the bit stream with a quadtree based method and retrieving sign and refinement information from the bit stream, providing an inverse successive approximation quantization of the decoded data and providing an inverse transform to produce image data from the decoded and inverse quantized bit stream.

The invention further applies to a system for processing image data being characterised in that it comprises a) means for transforming the input image data into different subbands, b) means for coding the transformed image data using successive approximation quantisation to produce a bit stream, the successive approximation being embedded in the coding process and c) means for coding significance information into the bit stream using a quadtree based method and including sign and refinement information to the bit stream.

The invention also applies to a system for processing a bit stream into image data, wherein the bit stream comprises significance, sign and refinement information, being characterised in that it comprises means for decoding the significance information from the bit stream with a quadtree based method and retrieving the sign and refinement information from the bit stream, means for providing an inverse successive approximation quantization of the decoded data and means for providing an inverse transform to produce image data from the decoded and inverse quantized bit stream.

The invention further applies to an image processing system being characterised in that for processing and transferring of image data it comprises means for transforming the input image data into different subbands, means for coding the transformed image data using successive approximation quantisation to produce a bit stream, the successive approximation being embedded in the coding process, means for coding significance information to the bit stream using a quadtree based method and including sign and refinement information to the bit stream, means for decoding the significance information from the bit stream with a quadtree based method and retrieving the sign and refinement information from the bit stream, means for providing an inverse successive approximation quantization of the decoded data and means for providing an inverse transform to produce image data.

Preferred embodiments of the invention have been presented in dependent claims.

The term "telecommunications system" in this text refers to any system for transferring information. The term "mobile telecommunications system" in this text refers generally to any telecommunications system which enables a wireless communication connection between a mobile station (MS) and the fixed parts of the system when the user of the mobile station is moving within the service area of the system. A typical mobile communications system is a Public Land Mobile Network (PLMN). The majority of mobile telecommunications systems in use at the time of filing this patent application belong to the second generation of such systems, a well-known example being the GSM system (Global System for Mobile telecommunications). The invention applies equally well to the next or third generation of mobile telecommunications systems. A system known as the UMTS (Universal Mobile Telecommunications System), which is currently undergoing standardisation, is referred to as an example. However, it is to be noted that although telecommunications is a suitable application for the present invention, the present invention is not in any way restricted to telecommunications environment.

Figure 2:
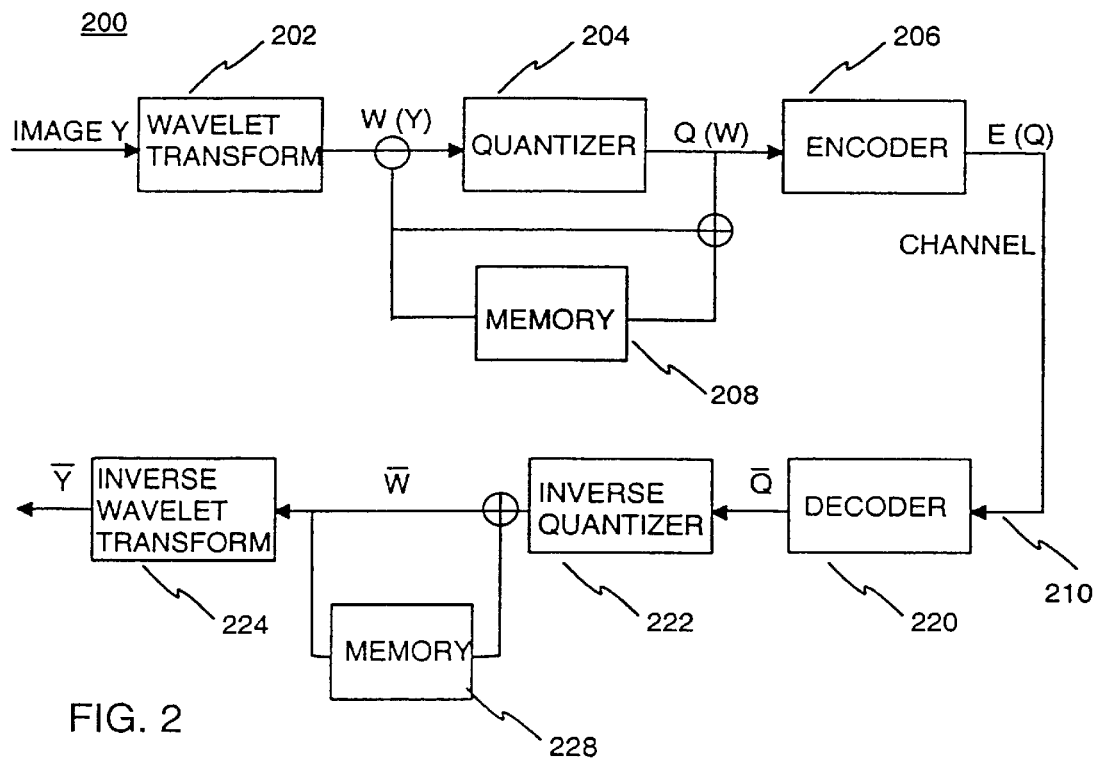
Figure 5:
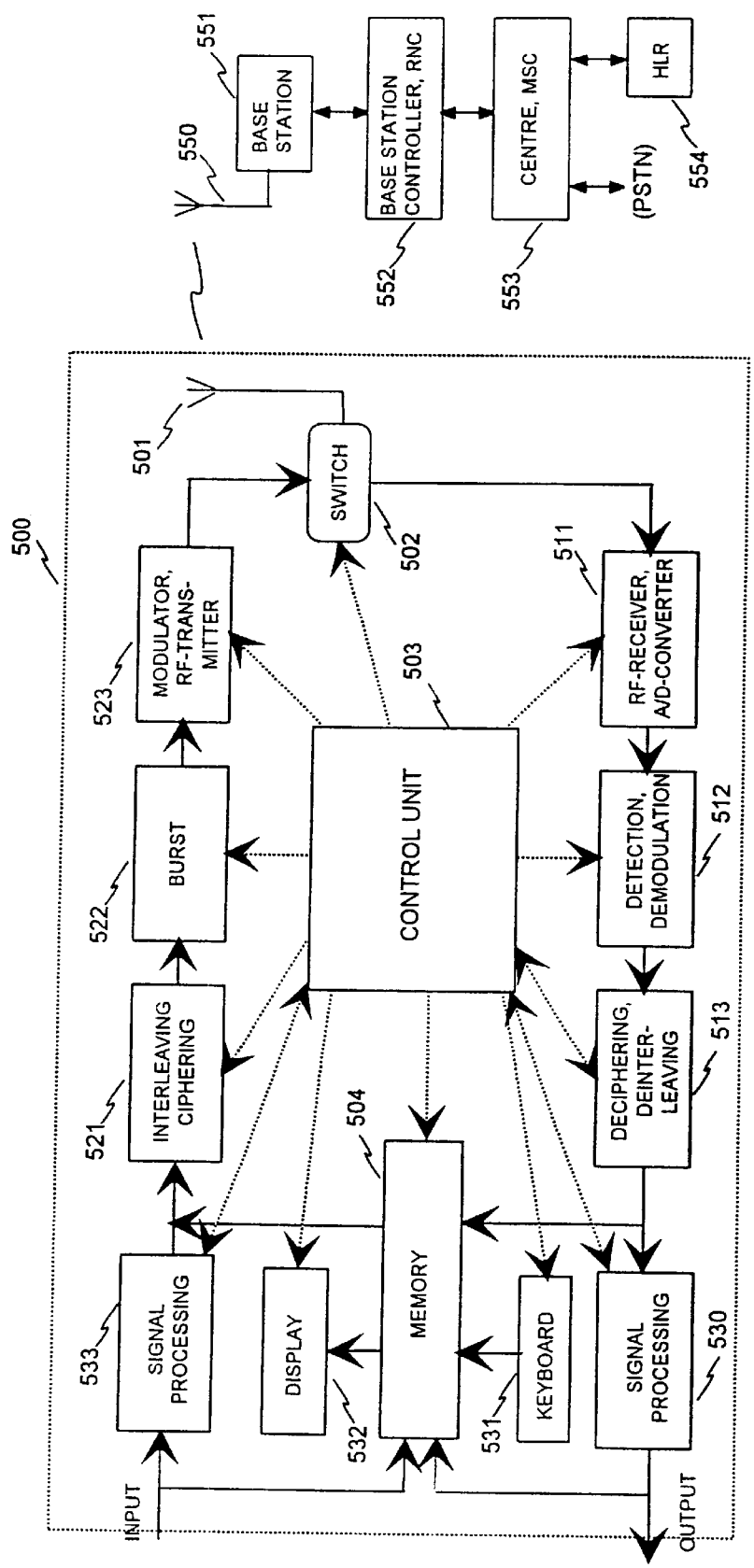

In the following the invention is described in more detail by means of the attached drawings in which FIG. 1 illustrates a prior known image transfer system, FIG. 2 illustrates a system for processing images according to the invention, FIG. 3 illustrates wavelet decomposition of image data, FIGS. 4a, 4b, 4c and 4d illustrate the quantization of a coefficient in quantization levels 0, 1, 2 and 3 respectively, and FIG. 5 illustrates a telecommunications device and its connection to a telecommunications system.

FIG. 1 was explained above in the prior art description. In the following the invention is described first at a basic level referring to FIG. 2 and then in more detail referring to FIGS. 2–4. Finally a telecommunications device according to the invention is described referring to FIG. 5.

FIG. 2 shows an exemplary embodiment of a system for processing images according to the invention. For the transformation of image data, block 202, a discrete wavelet transform is applied to the image. Details about performing wavelet transforms can be found in [6]. Then the quantization of the coefficients into determined levels Q(W), is performed using a successive approximation quantization method 204. The coefficients are mapped into levels to decrease the number of symbols to be coded. The levels of the quantization get finer at each quantization step as described in FIG. 3. A memory block 208 is used to store the results of the previous quantization step. The outcome of each quantization round is encoded on the fly by sending information in binary symbols about the significance of the coefficients with respect to the quantization levels 206. The sequence of binary symbols representing the significance of the coefficient with respect to the quantization levels is passed to the transfer channel, 210. The signal E that is received from the channel 210 is then decoded, 220, at the decoder of the receiver. The signal is further inverse quantized, 222, and inverse transformed, 224, to achieve the resulting image data $\overline{Y}$. The memory block 228 is used for adding the previously received data to the image data of the next quantization step. It should be noted that this method allows the decoding to be done on the fly when encoding starts, that is there is no need to wait for the entire bit stream to be received before decoding can be started. This means that decoding may be started before the encoding procedure has finished. This feature can be advantageous when large images are transmitted. The encoder starts coding and sending bits to the decoder which does not have wait to start decoding. In other words the encoder and decoder work substantially in parallel thus reducing the delay involved in encoding, transmitting and decoding an image.

FIG. 3 shows a representation of the image data after the transformation into the wavelet domain using a two-level wavelet transform. Each level contains a high-high band HH, low-high band LH, high-low band HL and low-low band LL. It is known that the LH band contains information relating to horizontal edges, the HL band is suited for detecting vertical edges, and the HH band contains most attributes in the diagonal direction. The LL band is substantially a coarser version of the original image. It is further passed to the next level of decomposition. It should be noted that the invention is not restricted to this decomposition method, but many other decomposition schemes can be alternatively used.

FIG. 3 shows how the image may be scanned in the transform domain in a two-level wavelet decomposition. However, the method can be extended to any number of levels, down to a typical image block size. A typical image block size is usually greater than or equal to 16×16 pixels, but the block size may also be smaller. In the wavelet domain, the coefficients are quantized successively in decreasing order of their magnitudes. This is embedded in the encoding scheme. In practical terms this means that a coefficient which is higher than the quantization level is sent before those which are smaller than the quantization level. This is very important when attempting to provide the best image quality at a certain bit rate or when trying to provide progressivity in image quality, because when the bit stream is truncated at a certain point this ensures that the highest coefficients at that point have been sent to the receiver, i.e. the most important information that reduces the distortion more than other coefficients is sent first. Therefore the minimum error is obtained. Depending on the amount of bits available, the quantization process is performed successively for finer quantization steps. For the first step a very coarse quantization $Q_1$ of the wavelet coefficients is obtained. One quantization step only identifies whether the value of the transform coefficient $w_i$ is higher or lower than half of the maximum absolute value of the transform coefficients, $C_{max}$:

$$Q_{1i} = \begin{cases} 0, & |w_i| < \frac{C_{max}}{2} \\ +1, & w_i \geq \frac{C_{max}}{2} \\ -1, & w_i \leq -\frac{C_{max}}{2} \end{cases} \quad (1)$$

Thus this step is equivalent to recording the coefficients which are significant with respect to a given quantization value. If a coefficient is significant, e.g. larger than or equal to the quantisation step, its sign is also determined and transferred, and the coefficient is replaced by the absolute value of its difference with the quantization value.

The corresponding reconstruction rule at the decoder is the following:

$$\hat{Q}_{1i} = \begin{cases} 0, & Q_{1i} = 0 \\ 1, 5\frac{C_{max}}{2}, & Q_{1i} = 1 \\ -1, 5\frac{C_{max}}{2}, & Q_{1i} = -1 \end{cases} \quad (2)$$

Next the second step of the quantization is started. There the above procedure is applied for the coefficients that are not already-significant using a quantizer $Q_2$ that is half of the previous quantizer. This process can be repeated using as many quantisation steps as desired/as appropriate for the number of bits available. As the quantization levels are made finer, it is necessary to refine the coefficients previously marked significant. The refinement is made by transmitting information about the coefficient with respect to the new quantization step size. A '1'/'0' means that the coefficient is larger/smaller than the additional step size and therefore an increase/decrease of its value by half the quantization step size is performed. This procedure is repeated for each quantization level. This is a preferred way of realizing Successive Approximation Quantitation.

The significance information is transferred in a quadtree fashion that is different from the previously described prior art solution. For the wavelet coefficients at every level, the highest quadrant in the present algorithm is the band itself (LL, LH, HL or HH). The band is coded in quad-tree method with respect to a quantization level using 2 symbols:

"1" to indicate that this quadrant has at least one significant coefficient and

"0" to indicate that this quadrant is insignificant.

If a quadrant is significant, it is further divided into 4 quadrants and each quadrant is coded as described above. The process is repeated until no more division is allowed. That is 1-pixel quadrants are reached. In this way no correlation is imposed on the pixels of a quadrant and Huffman coding can be used to code the significance information which can then be sent to the transmission channel 210. This method allows a whole region or a band to be coded, if non-significant, with one symbol, hence the term subband skipping is used to describe the feature of the invented method.

FIGS. 4a, 4b, 4c and 4d show, as an example, a process of quantizing the coefficient 75 on four levels. FIG. 4a shows the quantization level 0 with one quantizing value=0. Thus the coefficient 75 is quantized to value 0. FIG. 4b shows the quantization level 1 with two quantizing values; 0 and 60. Thus the coefficient 75 is quantized to value 60. FIG. 4c further shows the quantization level 2 with four quantizing values; 0, 30, 50 and 70. Thus the coefficient 75 is now quantized to value 70. FIG. 4d finally shows the quantization level 3 with eight quantizing values; 0, 15, 25, 35, 45, 55, 65 and 75. Thus the coefficient 75 is quantized to value 75.

FIG. 5 shows a block diagram of a telecommunications device, such as a mobile station 500, according to the invention. The FIG. 5 also shows its connection to a cellular telecommunications system. The telecommunications device comprises an antenna 501 for receiving radio frequency signals from base stations. The received RF signal is led with the switch 502 to the RF receiver 511, in which the RF signal is amplified and converted into a digital signal. Thereafter the signal is detected and demodulated in the block 512. The type of the demodulator depends on the radio interface of the telecommunications system. It may include a QAM demodulator, or a RAKE combiner. Deciphering and deinterleaving is performed in block 513. After this, the signal is processed according to the signal type (speech/image/data). If the received data is image data, the signal processing block performs the functions described by the blocks 220–228 in FIG. 2. Received and reconstructed image data $\bar{Y}$ can be shown on the display, or the image can be linked to a separate device, such as a video monitor. The image data can also be stored in the memory 504. A control unit 503 controls the receiver blocks according to a program that is stored in the memory 504.

In the transmission of data, the control unit 503 controls the signal processing block 533 according to the type of signal. If the input signal is image data, the signal processing block 533 processes tha data according to the inventive method, just as the blocks 202–208 in FIG. 2. Block 521 further performs the ciphering and interleaving for the signal. Bursts are formed from the coded data in block 522. The bursts are further modulated and amplified in block 523. The RF signal is led to the antenna 501 via the switch 502 for transmission. The processing and transmission blocks are also controlled by the control unit 503.

FIG. 5 further shows the parts of the cellular telecommunications system that are used in the transfer of the image data bit stream. The transmission and reception of an RF signal is made by the base station 551 and antenna 550. The base station has data transfer connections further to the radio network controller 552 and mobile switching center (msc) 553. The MSC is also connected to other radio network controllers, to a Home Location Register (HLR) 554 and to a Public Switched Telephone Network (PSTN).

The processing of information in a telecommunication device takes place in a signal processing unit in the form of microprocessor(s) and memory in the form of memory circuits. Such arrangements are known as such from the technology of mobile stations and fixed network elements. To convert a known telecommunication device into a telecommunication device according to the invention it is necessary to store in the memory means a set of machine-readable instructions that instruct the signal processor(s) to perform the operations described above. Composing and storing such instructions in the memory means involves known technology which, when combined with the teachings of this patent application, is within the capabilities of a person skilled in the art.

As mentioned above, the present invention has several advantageous features that make it ideal for mobile communications applications:

the required amount of arithmetic calculation is smaller compared to prior art methods as most of the coding requires only comparisons to be made, no classifications or rate allocations are needed, low requirement of memory capacity, an improvement of 0.1–0.5 dB in Power Signal-to-Noise Ratio (PSNR) over a prior art solution having a similar computation complexity as described in document [5] has been demonstrated.

Above, an embodiment of the solution according to the invention has been described. The principle according to the invention can naturally be modified within the frame of the scope defined by the claims, for example, by modification of the details of the implementation and ranges of use.

Cited Documents

[1] ISO/IEC JTC1 SC29/WG1 N610
[2] ISO/IEC JTC1 SC29/WG1 N632
[3] ISO/IEC JTC1 SC29/WG1 N665
[4] ISO/IEC JTC1 SC29/WG1 N638
[5] SPIE Vol. 3021, "A region of interest (ROI) Based Wavelet Compression Scheme for Medical Images", Shin et al., Department of Computer Science, Texas A&M University
[6] Wavelets and Signal Processing, Olivier Rioul and Martin Vetterli, IEEE Signal Processing Magazine, October 1991, pp. 14–36

What is claimed is:

1. A method for processing image data, comprising:

a) transforming the image data into sub-bands, the transformed image data for each sub-band comprising a set of transform coefficients, each of said set of transform coefficients having a sign and a value;

b) quantizing the transformed image data using successive approximation quantization to produce a bit-stream, the successive approximation being embedded in the coding process and comprising quantisation at a number of successive quantisation levels, each quantisation level having an associated quantisation threshold; and c) coding the bit-stream with significance information to produce a coded bit-stream using a quadtree based method and including sign and refinement information in the coded bit-stream, wherein for a given sub-band at any one of said number of successive approximation quantisation levels, the method comprises:

d) determining whether a sub-band contains at least one transform coefficient that is significant with respect to the quantisation threshold defined for said quantisation level;

e) if said sub-band contains at least one transform coefficient that is significant with respect to said quantisation threshold, indicating in the coded bit-stream that the sub-band contains at least one significant transform coefficient value using a first significance value;

f) if said sub-band does not contain any transform coefficient that is significant with respect to said quantisation threshold, indicating in the coded bit-stream that the sub-band does not contain any significant transform coefficient value using a second significance value;

g) if said sub-band contains at least one transform coefficient that is significant with respect to said quantisation threshold, dividing said sub-band into four quadrants and repeating steps d) to g) for each of the quadrants until no further division is possible or until a desired level of division is reached.

2. A method according to claim 1, wherein step a) is performed using a wavelet transform.

3. A method according to claim 1, comprising skipping a sub-band by transferring a single, predetermined symbol.

4. A method according to claim 1, further comprising transmitting the coded bit-stream in a transmission channel.

5. A method according to claim 1, wherein at a first level of said number of successive quantization levels the following steps are performed:

defining the quantization threshold to be used in quantizing said set of transform coefficients at said first level of said number of successive quantization levels;

comparing the value of a transform coefficient of said set of transform coefficients with said quantization threshold; and if the value of said transform coefficient is greater than or equal to said quantization threshold, indicating that said transform coefficient is significant with respect to said quantization threshold using said first significance value, indicating the sign of the transform coefficient and replacing the value of said transform coefficient with a value equal to the absolute value of the difference between its value and the quantization threshold; or if the value of said transform coefficient is less than said quantization threshold, indicating that said transform coefficient is insignificant with respect to said quantization threshold using said second significance value.

6. A method according to claim 5, comprising determining a maximum absolute coefficient value from said set of transform coefficients and setting the quantization threshold to be used in quantizing said set of transform coefficients at the first level of said number of successive quantisation levels equal to one half of said maximum absolute coefficient value.

7. A method according to claim 5, wherein successive approximation quantisation at each subsequent level of said number of successive quantization levels following said first level is performed by:

defining a new quantization threshold to be used in quantizing said set of transform coefficients at said subsequent level of said number of successive quantization levels, said new quantization threshold being smaller than that used at an immediately preceding level of said number of successive quantization levels;

comparing the value of a transform coefficient indicated as being insignificant at said immediately preceding level with said new quantization threshold; and if the value of said transform coefficient indicated as being insignificant at said immediately preceding level is greater than or equal to said new quantization threshold, indicating that said transform coefficient is significant with respect to said new quantization threshold using said first significance value, indicating the sign of the transform coefficient and replacing the value of said transform coefficient with a value equal to the absolute value of the difference between its value and the new quantization threshold; or if the value of said transform coefficient indicated as being insignificant at said immediately preceding level is less than said new quantization threshold, indicating that said transform coefficient is insignificant with respect to said new quantization threshold using said second significance value.

8. A method according to claim 1, wherein said first significance value is 1 and said second significance value is 0.

9. A method according to claim 7, further comprising:

comparing the value of a transform coefficient indicated as being significant at said immediately preceding level with said new quantization threshold;

associating a first refinement value with said transform coefficient if its value larger than the new quantization threshold;

associating a second refinement value with said transform coefficient if its value is smaller than the new quantization threshold.

10. A method according to claim 9, wherein said first refinement value is 1 and said second refinement value is 0.

11. A method according to claim 1, wherein repetition of steps d) to g) for each of the quadrants comprises performing the following steps on each of the four quadrants:

i) determining whether the quadrant contains at least one transform coefficient that is significant with respect to the quantization threshold defined for said quantisation level;

ii) if the quadrant contains at least one transform coefficient that is significant with respect to said quantization threshold, indicating in the coded bit-stream that the quadrant contains at least one significant transform coefficient value using said first significance value;

iii) if the quadrant does not contain any transform coefficient that is significant with respect to said quantization threshold, indicating in the coded bit-stream that the quadrant does not contain any significant transform coefficient value using said second significance value;

iv) for any of said quadrants that contain at least one transform coefficient that is significant with respect to the quantization threshold, dividing said quadrant into four further quadrants and repeating steps i) to iv) until no further division is possible or until a desired level of division is reached.

12. A method according to claim 1, comprising performing steps d) to g) on each of said sub-bands.

13. A method according to claim 1, comprising performing steps d) to g) for each quantization level in order of quantization threshold size starting from the first quantization level, thereby producing a coded bit-stream with significance information ordered according to the size of the transform coefficients in said sub-band or quadrant.

14. A method for processing a coded bit-stream into image data, the bit-stream comprising significance, sign and refinement information representative of transform coefficients derived from the image data by transforming the image data into sub-bands, the transformed image data for each sub-band comprising a set of transform coefficients, each of said set of transform coefficients having a sign and a value, the method comprising:

a) decoding the significance information from the coded bit-stream with a quadtree based method and retrieving sign and refinement information from the bit-stream;

b) providing an inverse successive approximation quantization of the decoded data comprising inverse quantisation at a number of successive quantisation levels, each quantisation level having an associated quantisation threshold to form reconstructed values for the transform coefficients; and c) providing an inverse transform to produce image data from the reconstructed transformed coefficient values, wherein said refinement information comprises a first refinement value and a second refinement value, said first and second refinement values being associated with a given transform coefficient and describing the reconstructed value of said transform coefficient with respect to the quantisation threshold corresponding to a given one of said quantisation levels, wherein the method further comprises the steps of:

d) increasing the reconstructed value of said transform coefficient by an amount equal to one half of the quantisation threshold if said first refinement value is retrieved from said bit-stream;

e) decreasing the reconstructed value of said transform coefficient by an amount equal to one half of the quantisation threshold if said second refinement value is retrieved from said bit-stream.

15. A method according to claim 14, wherein a predetermined symbol is determined as a skipped sub-band.

16. A method according to claim 14, wherein the coded bit-stream is received from a transmission channel.

17. A system for processing image data, comprising:

means for transforming the image data into different sub-bands, the transformed image data for each sub-band comprising a set of transform coefficients, each of said set of transform coefficients having a sign and a value;

means for quantizing the transformed image data using successive approximation quantization to produce a bit-stream, the successive approximation being embedded in the coding process and comprising quantisation at a number of successive quantisation levels, each quantisation level having an associated quantisation threshold; and means for coding the bit-stream with significance information to produce a coded bit-stream using a quadtree based method and including sign and refinement information in the coded bit-stream, wherein the system further comprises:

means for dividing a sub-band into four quadrants and for dividing a quadrant into a further four quadrants until no further division is possible or until a desired level of division is reached;

means for determining whether a sub-band or a quadrant contains a transform coefficient that is significant with respect to the quantisation threshold defined for a given quantisation level;

means for indicating in the coded bit-stream that a sub-band or quadrant contains a significant transform coefficient using a first significance value, if said sub-band or quadrant contains a transform coefficient that is significant with respect to said quantisation threshold;

means for indicating in the coded bit-stream that a sub-band or quadrant does not contain a significant transform coefficient using a second significance value, if said sub-band or quadrant does not contain a transform coefficient that is significant with respect to said quantisation threshold.

18. A system for processing image data according to claim 17, further comprising means for coding a skipped sub-band with a single predetermined symbol.

19. A system for processing image data according to claim 17, implemented in a telecommunications device for processing image information to be transmitted in a data transfer channel, the telecommunication device further comprising means for transmitting the coded bit-stream to the data transfer channel.

20. A system for processing image data according to claim 17, further comprising:

means for defining a quantization threshold to be used in quantizing said set of transform coefficients at a first of said number of successive quantization levels;

means for comparing the value of a transform coefficient of said set of transform coefficients with said quantization threshold;

means for indicating that said transform coefficient is significant with respect to said quantization threshold using said first significance value, if the value of said transform coefficient is greater than or equal to said quantization threshold;

means for indicating the sign of said transform coefficient, if the value of said transform coefficient is greater than or equal to said quantization threshold;

means for replacing the value of said transform coefficient with a value equal to the absolute value of the difference between its value and the quantization threshold, if the value of said transform coefficient is greater than or equal to said quantization threshold;

means for indicating that said transform coefficient is insignificant with respect to said quantization threshold using said second significance value, if the value of said set of transform coefficient is less than said quantization threshold.

21. A system for processing image data according to claim 20, further comprising:

means for defining a new quantization threshold to be used in quantizing said set of transform coefficients at a subsequent level of said number of successive quantization levels following said first level, said new quantization threshold being smaller than that used at an immediately preceding level of said number of successive quantization levels;

means for comparing the value of a transform coefficient indicated as being insignificant at said immediately preceding level with said new quantization threshold;

means for indicating that said transform coefficient is significant with respect to said new quantization threshold using said first significance value, if the value of said transform coefficient is greater than or equal to said new quantization threshold;

means for indicating the sign of said transform coefficient, if the value of said transform coefficient is greater than or equal to said new quantization threshold;

means for replacing the value of said transform coefficient with a value equal to the absolute value of the difference between its value and the new quantization threshold, if the value of said transform coefficient is greater than or equal to said new quantization threshold;

means for indicating that said transform coefficient is insignificant with respect to said new quantization threshold using said second significance value, if the value of said transform coefficient is less than said new quantization threshold.

22. A system for processing image data according to claim 21, further comprising:

means for comparing a value of a transform coefficient indicated as being significant at said immediately preceding level with said new quantization threshold;

means for associating a first refinement value with a transform coefficient whose value is larger than the new quantization threshold;

means for associating a second refinement value with a transform coefficient whose value is smaller than the new quantization threshold.

23. A system for processing a bit-stream into image data, the bit-stream comprising significance, sign and refinement information representative of transform coefficients derived from the image data by transforming the image data into sub-bands, the transformed image data for each sub-band comprising a set of transform coefficients, each of said set of transform coefficients having a sign and a value, the system comprising:

means for decoding the significance information from the bit-stream with a quadtree based method and retrieving the sign and refinement information from the bit-stream;

means for providing an inverse successive approximation quantization of the decoded data comprising inverse quantisation at a number of successive quantisation levels, each quantisation level having an associated quantisation threshold to form reconstructed values for the transform coefficients; and means for providing an inverse transform to produce image data from the reconstructed transform coefficient values, wherein said refinement information comprises a first refinement value and a second refinement value, said first and second refinement values being associated with a given transform coefficient and describing the reconstructed value of said transform coefficient with respect to the quantisation threshold corresponding to a given one of said quantisation levels, the system further comprising:

means for increasing the reconstructed value of said transform coefficient by an amount equal to one half of the quantisation threshold if said first refinement value is retrieved from said bit-stream;

means for decreasing the reconstructed value of said transform coefficient by an amount equal to one half of the quantisation threshold if said second refinement value is retrieved from said bit-stream.

24. A system for processing a bit-stream into image data according to claim 23, wherein the system comprises means for interpreting a predetermined single symbol as a skipped sub-band.

25. A system for processing a bit-stream into image data according to claim 23, implemented as part of a telecommunication device for processing image information received from a data transfer channel, the telecommunication device further comprising means for receiving the coded bit-stream from the data transfer channel.

26. A method for processing a coded bit-stream into image data, the bit-stream comprising significance, sign and refinement information representative of transform coefficients derived from the image data by transforming the image data into sub-bands, the transformed image data for each sub-band comprising a set of transform coefficients, each of said set of transform coefficients having a sign and a value, the method comprising:

a) decoding the significance information from the coded bit-stream with a quadtree based method and retrieving sign and refinement information from the bit-stream;

b) providing an inverse successive approximation quantisation of the decoded data comprising inverse quantisation at a number of successive quantisation levels, each quantisation level having an associated quantisation threshold to form reconstructed values for the transform coefficients; and c) providing an inverse transform to produce image data from the reconstructed transform coefficient values, wherein for a given sub-band at any one of said number of successive approximation quantisation levels, the method comprises:

d) receiving one of a first significance value and a second significance value from the coded bit-stream, the first and second significance values being representative of the significance of the transform coefficients with respect to the quantisation threshold associated with said quantisation level;

e) determining that the sub-band contains at least one transform coefficient that is significant with respect to said quantisation threshold if said first significance value is received from the coded bit-stream;

f) determining that the sub-band does not contain any transform coefficient that is significant with respect to said quantisation threshold, if said second significance value is received from the coded bit-stream;

g) if said sub-band contains at least one transform coefficient that is significant with respect to said quantisation threshold, repeating steps d) to g) to receive significance values representative of transform coefficients in quadrants of the sub-band.

27. A method for processing a coded bit-stream into image data according to claim 26, wherein steps d) to g) are repeated until the received significance values are representative of one-pixel quadrants.

28. A system for processing a coded bit-stream into image data, the bit-stream comprising significance, sign and refinement information representative of transform coefficients derived from the image data by transforming the image data into sub-bands, the transformed image data for each sub-band comprising a set of transform coefficients, each of said set of transform coefficients having a sign and a value, the system comprising:

means for decoding the significance information from the coded bit-stream with a quadtree based method and retrieving sign and refinement information from the bit-stream;

means for providing an inverse successive approximation quantisation of the decoded data comprising inverse quantisation at a number of successive quantisation levels, each quantisation level having an associated quantisation threshold to form reconstructed values for the transform coefficients; and means for providing an inverse transform to produce image data from the reconstructed transform coefficient values, wherein said means for decoding the significance information from the coded bit-stream with a quadtree based method is arranged to:

receive one of a first significance value and a second significance value from the coded bit-stream, the first and second significance values being representative of the significance of the transform coefficients with respect to the quantisation threshold associated with a given quantisation level;

determine that the sub-band contains at least one transform coefficient that is significant with respect to said quantisation threshold if said first significance value is received from the coded bit-stream;

determine that the sub-band does not contain any transform coefficient that is significant with respect to said quantisation threshold, if said second significance value is received from the coded bit-stream; and wherein said means for decoding the significance information from the coded bit-stream with a quadtree based method is further arranged to receive significance information representative of transform coefficients in quadrants of said sub-band if it is determined that the sub-band contains at least one transform coefficient that is significant with respect to said quantisation threshold.

29. An encoder for forming a compressed representation of a digital image, the encoder being adapted to process image data and comprising:

a transform processor for transforming the image data, by applying a discrete wavelet transform to the image, into sub-bands, the transformed image data for each sub-band comprising a set of transform coefficients, each of said set of transform coefficients having a sign and a value;

a quantizing processor for quantising the transformed image data using successive approximation quantisation to produce a bit-stream, the successive approximation being embedded in the coding process and comprising quantisation at a number of successive quantisation levels, each quantisation level having an associated quantisation threshold; and a coding processor for coding the bit-stream with significance information to produce a coded bit-stream using a quadtree based method and including sign and refinement information in the coded bit-stream, wherein for a given sub-band at any one of said number of successive approximation quantisation levels, the encoder system is further adapted to:

a) determine whether a sub-band contains at least one transform coefficient that is significant with respect to the quantisation threshold defined for said quantisation level;

b) if said sub-band contains at least one transform coefficient that is significant with respect to said quantisation threshold, indicating in the coded bit-stream that the sub-band contains at least one significant transform coefficient value using a first significance value;

c) if said sub-band does not contain any transform coefficient that is significant with respect to said quantisation threshold, indicating in the coded bit-stream that the sub-band does not contain any significant transform coefficient value using a second significance value;

d) if said sub-band contains at least one transform coefficient that is significant with respect to said quantisation threshold, dividing said sub-band into four quadrants and repeating steps a) to d) for each of the quadrants until no further division is possible or until a desired level of division is reached.

30. The encoder of claim 29, wherein the encoder is part of a telecommunication device.

31. The encoder of claim 29, wherein the encoder is part of a mobile telephone.

32. A decoder for reconstructing a digital image from an encoded bit-stream, the decoder adapted to decode a bit-stream encoded by:

a) transforming the image data into sub-bands, the transformed image data for each sub-band comprising a set of transform coefficients, each of said set of transform coefficients having a sign and a value;

b) quantising the transformed image data using successive approximation quantisation to produce a bit-stream, the successive approximation being embedded in the coding process and comprising quantisation at a number of successive quantisation levels, each quantisation level having an associated quantisation threshold; and c) code the bit-stream with significance information to produce a coded bit-stream using a quadtree based method and including sign and refinement information in the coded bit-stream, wherein for a given sub-band at any one of said number of successive approximation quantisation levels, the encoding further comprises:

d) determining whether a sub-band contains at least one transform coefficient that is significant with respect to the quantisation threshold defined for said quantisation level; and e) if said sub-band contains at least one transform coefficient that is significant with respect to said quantisation threshold, indicating in the coded bit-stream that the sub-band contains at least one significant transform coefficient value using a first significance value;

f) if said sub-band does not contain any transform coefficient that is significant with respect to said quantisation threshold, indicating in the coded bit-stream that the sub-band does not contain any significant transform coefficient value using a second significance value;

g) if said sub-band contains at least one transform coefficient that is significant with respect to said quantisation threshold, dividing said sub-band into four quadrants and repeating steps d) to g) for each of the quadrants until no further division is possible or until a desired level of division is reached.

33. The decoder of claim 32, wherein the decoder is included in a telecommunication device.

34. The decoder of claim 32, wherein the decoder is part of a mobile telephone.

35. A system for processing image data comprising:

an encoder for forming a compressed representation of a digital image, the encoder comprising:

a transform processor for transforming the image data, by applying a discrete wavelet transform to the image, into sub-bands, the transformed image data for each sub-band comprising a set of transform coefficients, each of said set of transform coefficients having a sign and a value;

a quantizing processor for quantising the transformed image data using successive approximation quantisation to produce a bit-stream, the successive approximation being embedded in the coding process and comprising quantisation at a number of successive quantisation levels, each quantisation level having an associated quantisation threshold; and a coding processor for coding the bit-stream with significance information to produce a coded bit-stream using a quadtree based method and including sign and refinement information in the coded bit-stream, wherein for a given sub-band at any one of said number of successive approximation quantisation levels, the encoder system is further adapted to:
  a) determine whether a sub-band contains at least one transform coefficient that is significant with respect to the quantisation threshold defined for said quantisation level; and
  b) if said sub-band contains at least one transform coefficient that is significant with respect to said quantisation threshold, indicating in the coded bit-stream that the sub-band contains at least one significant transform coefficient value using a first significance value;
  c) if said sub-band does not contain any transform coefficient that is significant with respect to said quantisation threshold, indicating in the coded bit-stream that the sub-band does not contain any significant transform coefficient value using a second significance value;
  d) if said sub-band contains at least one transform coefficient that is significant with respect to said quantisation threshold, dividing said sub-band into four quadrants and repeating steps a) to d) for each of the quadrants until no further division is possible or until a desired level of division is reached; and a decoder for reconstructing a digital image from an encoded bit stream encoder by the encoder.

* * * * *